United States Patent
He et al.

(10) Patent No.: US 7,350,711 B2
(45) Date of Patent: Apr. 1, 2008

(54) AMBIENT LIGHT SHIELD AND COLOR FILTER FOR IMAGING-BASED BAR CODE READER

(75) Inventors: Duanfeng He, S Setuaket, NY (US); Eugene Joseph, Coram, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 18 days.

(21) Appl. No.: 11/364,250

(22) Filed: Feb. 28, 2006

(65) Prior Publication Data

US 2007/0199996 A1    Aug. 30, 2007

(51) Int. Cl.
*G06K 7/10* (2006.01)

(52) U.S. Cl. .............................. 235/462.2; 235/462.42; 235/462.43

(58) Field of Classification Search ............. 235/462.2, 235/462.21, 462.26, 462.29, 462.35, 462.42, 235/472.01, 462.22, 462.06, 462.43
See application file for complete search history.

(56) References Cited

U.S. PATENT DOCUMENTS

| | | | | |
|---|---|---|---|---|
| 4,870,274 A | * | 9/1989 | Hebert et al. ................ | 250/236 |
| 5,373,148 A | * | 12/1994 | Dvorkis et al. ......... | 235/462.36 |
| 5,541,419 A | * | 7/1996 | Arackellian ................. | 250/566 |
| 5,778,133 A | * | 7/1998 | Plesko ......................... | 385/146 |
| 5,818,028 A | * | 10/1998 | Meyerson et al. ...... | 235/472.01 |
| 6,209,789 B1 | * | 4/2001 | Amundsen et al. .... | 235/472.01 |
| 6,340,114 B1 | * | 1/2002 | Correa et al. .......... | 235/462.22 |
| 6,375,075 B1 | * | 4/2002 | Ackley et al. ......... | 235/462.04 |
| 6,752,319 B2 | * | 6/2004 | Ehrhart et al. .............. | 235/486 |
| 6,915,955 B2 | * | 7/2005 | Jung et al. ............. | 235/462.06 |

* cited by examiner

*Primary Examiner*—Steven S. Paik
*Assistant Examiner*—Kumiko C. Koyama
(74) *Attorney, Agent, or Firm*—Tarolli, Sundheim, Covell & Tummino LLP

(57) ABSTRACT

An ambient illumination shielding apparatus for an imaging-based scanner adapted to read direct part marking (DPM) bar codes. The shielding apparatus includes an illumination shield extending from a housing of the scanner and extending along at least a portion of a path of travel of an aiming pattern generated by an aiming apparatus of the scanner. The shield passes illumination within a predetermined wavelength range and impedes passage of illumination outside of the predetermined wavelength range. The predetermined wavelength range of the shield includes a wavelength range of the aiming pattern generated by the aiming apparatus. The shielding apparatus further includes a filter disposed in proximity to an imaging system of the scanner and passing illumination within a predetermined wavelength range to the pixel array and impeding the passage of illumination outside of the predetermined wavelength range. The predetermined wavelength range of the filter includes a wavelength range of an illumination system of the scanner.

20 Claims, 5 Drawing Sheets

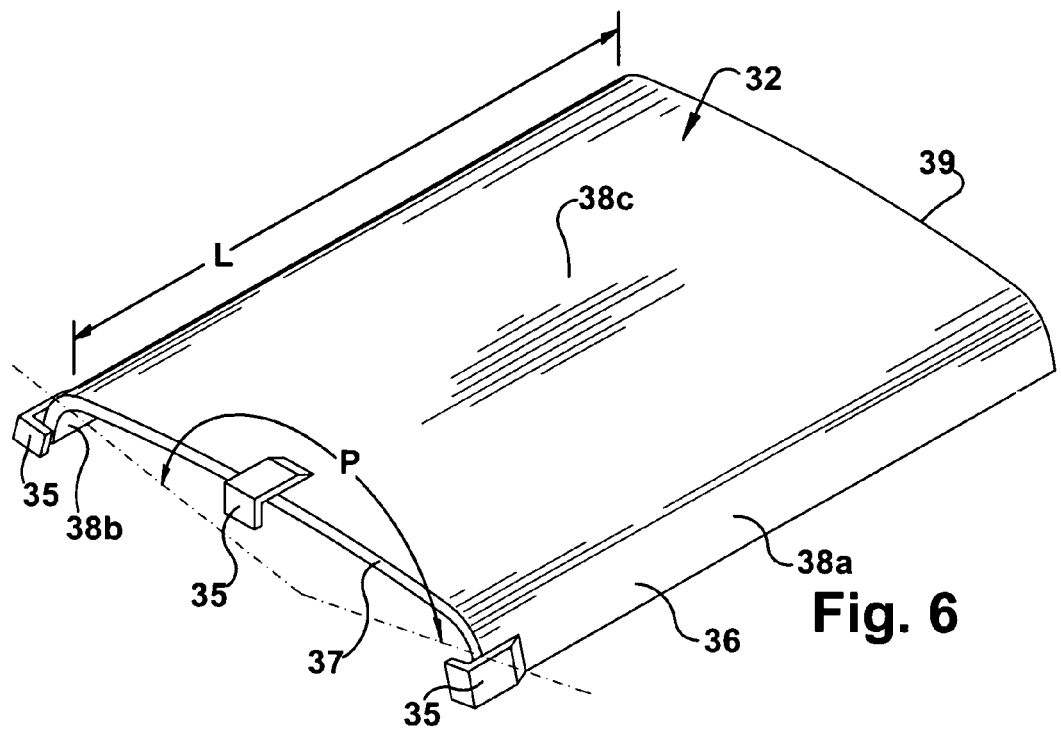
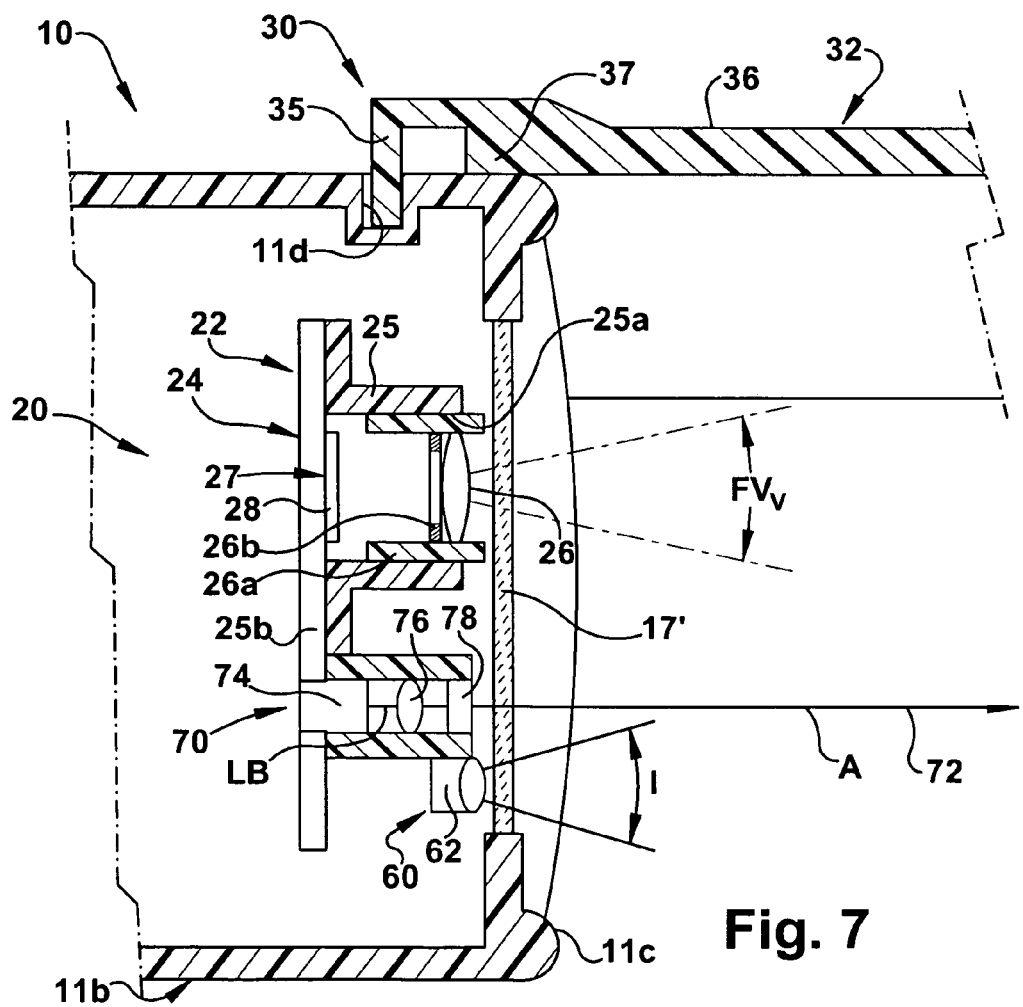

AMBIENT LIGHT SHIELD AND COLOR FILTER FOR IMAGING-BASED BAR CODE READER

FIELD OF THE INVENTION

The present invention relates to an ambient light shield and color filter for an imaging-based bar code reader that facilitates reading of direct part marking (DPM) bar codes.

BACKGROUND OF THE INVENTION

Various electro-optical systems have been developed for reading optical indicia, such as bar codes. A bar code is a coded pattern of graphical indicia comprised of a series of bars and spaces having differing light reflecting characteristics. The pattern of the bars and spaces encode information. In certain bar codes, there is a single row of bars and spaces, typically of varying widths. Such bar codes are referred to as one dimensional bar codes. Other bar codes include multiple rows of bars and spaces, each typically having the same width. Such bar codes are referred to as two dimensional bar codes. Devices that read and decode one and two dimensional bar codes utilizing imaging systems that image and decode imaged bar codes are typically referred to as imaging-based bar code readers or bar code scanners.

Imaging systems include charge coupled device (CCD) arrays, complementary metal oxide semiconductor (CMOS) arrays, or other imaging pixel arrays having a plurality of photosensitive elements or pixels. An illumination system comprising light emitting diodes (LEDs) or other light source directs illumination toward a target object, e.g., a target bar code. Light reflected from the target bar code is focused through a lens of the imaging system onto the pixel array. Thus, an image of a field of view of the focusing lens is focused on the pixel array. Periodically, the pixels of the array are sequentially read out generating an analog signal representative of a captured image frame. The analog signal is amplified by a gain factor and the amplified analog signal is digitized by an analog-to-digital converter. Decoding circuitry of the imaging system processes the digitized signals and attempts to decode the imaged bar code.

An emerging trend in bar code technology is direct part marking (DPM). In DPM coded indicia is imprinted directly on an item, such as a metal or plastic item. This provides permanent encoded information regarding the item that remains with the item throughout its life. In one popular method of DPM, the item is marked by subjecting a surface of the item to a series of impacts by a peening device. Each impact creates a "crater" or indentation in the item surface and a collection of craters form a pattern that conforms to a symbology of a two dimensional bar code. A commonly used two dimensional bar code symbology for DPM is the DataMatrix code. The DataMatrix bar code stores encoded information in a square or rectangular symbol that can typically range in size from 0.001 inch per side to 14 inches per side. Other methods of DPM include laser etching, chemical etching and electro-chemical etching.

DPM bar codes are more problematic to image and decode than bar codes printed on a diffuse material such as paper. This is because certain types of DPM bar codes have no intrinsic or natural contrast at the site of the markings, the markings consist of shallow indentations or craters in the background surface of the item. Further, each crater typically includes a center hole and a rim. In other types of DPM bar codes, instead of indentations, DPM markings constitute added material onto a substrate or background, where the added material is of the same kind as the substrate material. When such a DPM bar code is being read by a bar code reader or scanner, the scanner must rely on the creation of highlights and shadows on the item to properly detect the modified surface profile. If a narrow beam of light from the scanner's illumination system is used to illuminate a DPM bar code, the craters (depressions) will include both a bright highlight area and a shadow area. This is because of the shape of the crater which includes a center hole and a rim. The background, i.e., the flat or non-indented portions of the bar code, remains a relatively dark shadow area. When imaging a DPM bar code, areas of highlight and/or shadows may represent craters corresponding to a black bars or modules of a conventional 2D bar code, while the relatively unchanged background areas are assumed to correspond to spaces of a conventional bar code printed on a diffuse medium.

When reading a bar code, the bar code is illuminated by the illumination system of the bar code reader as well as being subject to ambient illumination. Typically, ambient illumination originates from multiple sources, for example, e.g., multiple ceiling fixtures having overhead fluorescent and/or incandescent lights, sunlight, etc. When bar codes are printed on diffuse material, the contrast of the features of the bar code (the bars and spaces) on the background material are not degraded by the direction or number of the illumination sources.

However, a DPM bar code is very different. When multiple illumination sources impinge upon the DPM bar code, each illumination source may produce a shadow and a highlight for each single DPM feature (each crater). When imaged by the bar code reader, such multiple shadows/highlights for each crater can complicate the decoding of the captured image of the DPM bar code.

What is desired is an imaging-based bar code reader that reduces the detrimental effect of ambient light when imaging and decoding a target image such as a target bar code.

SUMMARY OF THE INVENTION

The present invention includes an ambient illumination shielding apparatus including an illumination shield and a filter for use in an imaging-based automatic identification system, such as a bar code reader. The ambient illumination shielding apparatus is particularly useful where the bar code reader is used to read DPM indicia such as DPM bar codes.

The bar code reader includes a 2D imaging system comprising a camera assembly, an illumination system for illuminating a target object, such as a target bar code, and an aiming apparatus, such as a laser aiming apparatus generating an aiming pattern to aid a user of the reader in aiming the reader at the target object.

The camera assembly includes a 2D pixel array and a focusing lens to focus reflected light from the target object onto the pixel array. During an exposure time, the reflected light from the target object is focused onto the pixel array and the pixel array is in a state such that the pixels receive the reflected light and generate an electrical signal, the magnitude of which depends on the intensity of the light focused on the individual pixels.

The illumination shield comprises a shield extending from a housing of the reader along at least a portion of a path of travel of the aiming pattern. The illumination shield passes illumination within a predetermined wavelength range and impedes passage of illumination outside of the predetermined wavelength range. The predetermined wavelength range of the illumination shield includes a wavelength range of the aiming pattern.

The filter disposed adjacent the focusing lens and passing illumination with a predetermined wavelength range to the pixel array and impeding the passage of illumination outside of the predetermined wavelength range. The predetermined wavelength range of the filter includes a wavelength range of the illumination system.

These and other objects, advantages, and features of the exemplary embodiment of the invention are described in detail in conjunction with the accompanying drawings.

BRIEF DESCRIPTION OF THE DRAWINGS

FIG. 6 is a perspective view of a portion of an illumination shield of the imaging-based bar code reader of FIG. 1; and FIG. 7 schematic sectional view of a portion of the imaging-based bar code reader of FIG. 1 showing the scanner head the scanner head and an alternate embodiment of the ambient illumination shielding apparatus of the present invention.

DETAILED DESCRIPTION

Figure 1:
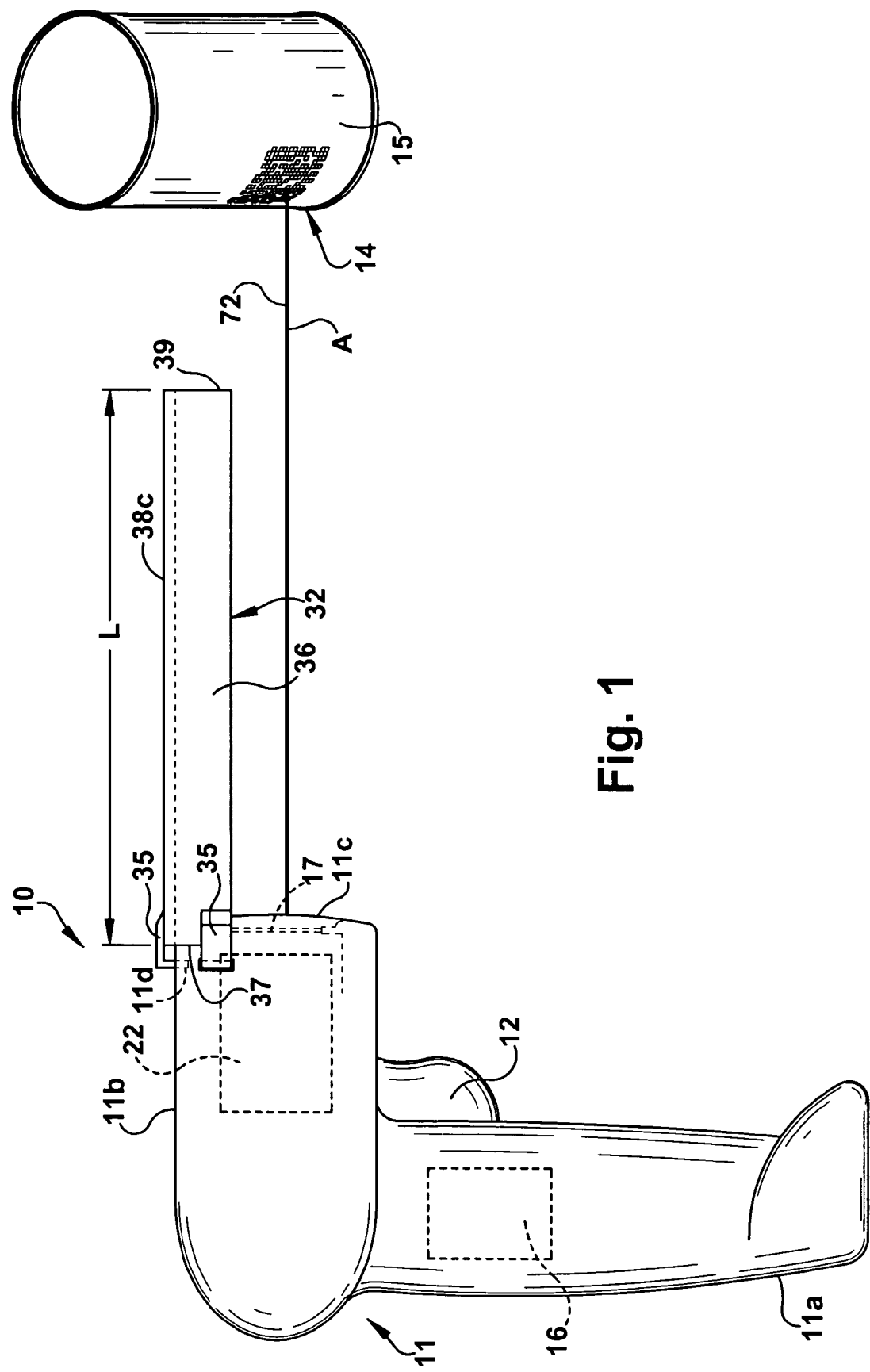
FIG. 1 is a schematic side elevation view of an imaging-based bar code reader of the present invention.

An imaging-based reader, such as an imaging-based bar code reader, is shown schematically at 10 in FIG. 1. The bar code reader 10, in addition to imaging and decoding both 1D and 2D bar codes and postal codes, is also capable of capturing images and signatures. The bar code reader 10 includes an imaging system 20 and a decoding system 40 for capturing image frames of a field of view FV of the imaging system 20 and decoding encoded indicia within a captured image frame. The bar code reader 10 includes a housing 11 supporting the imaging and decoding systems 20, 40 within an interior region of the housing 11.

The imaging system 20 comprises and an imaging camera assembly 22 and associated imaging circuitry 24. The imaging camera 22 includes a housing 25 supporting a focusing lens 26 and an imager 27 comprising a pixel array 28. The imager 27 is enabled during an exposure period to capture an image of the field of view FV of the focusing lens 26.

The bar code reader 10 of the present invention includes an ambient illumination shielding apparatus 30 which makes the reader 10 particularly suited to imaging and decoding direct part marking (DPM) bar codes, that is, bar codes which are etched, peened or otherwise permanently marked into a surface of an item. The ambient illumination shielding apparatus 30 includes an illumination shield 32 and a filter 34 which function to reduce ambient illumination incident on the pixel array 28, that is, to reduce a quantity of ambient illumination that otherwise would be focused by the focusing lens 26 onto the pixel 28.

In one preferred embodiment of the present invention, the bar code reader 10 is a hand held portable reader encased in the pistol-shaped housing 11 adapted to be carried and used by a user walking or riding through a store, warehouse or plant for reading bar codes for stocking and inventory control purposes. However, it should be recognized that the present invention is equally useful in other types of DPM scanners, such as a fixed-position scanner or a hand-held computer containing a DPM scanner.

Figure 2:
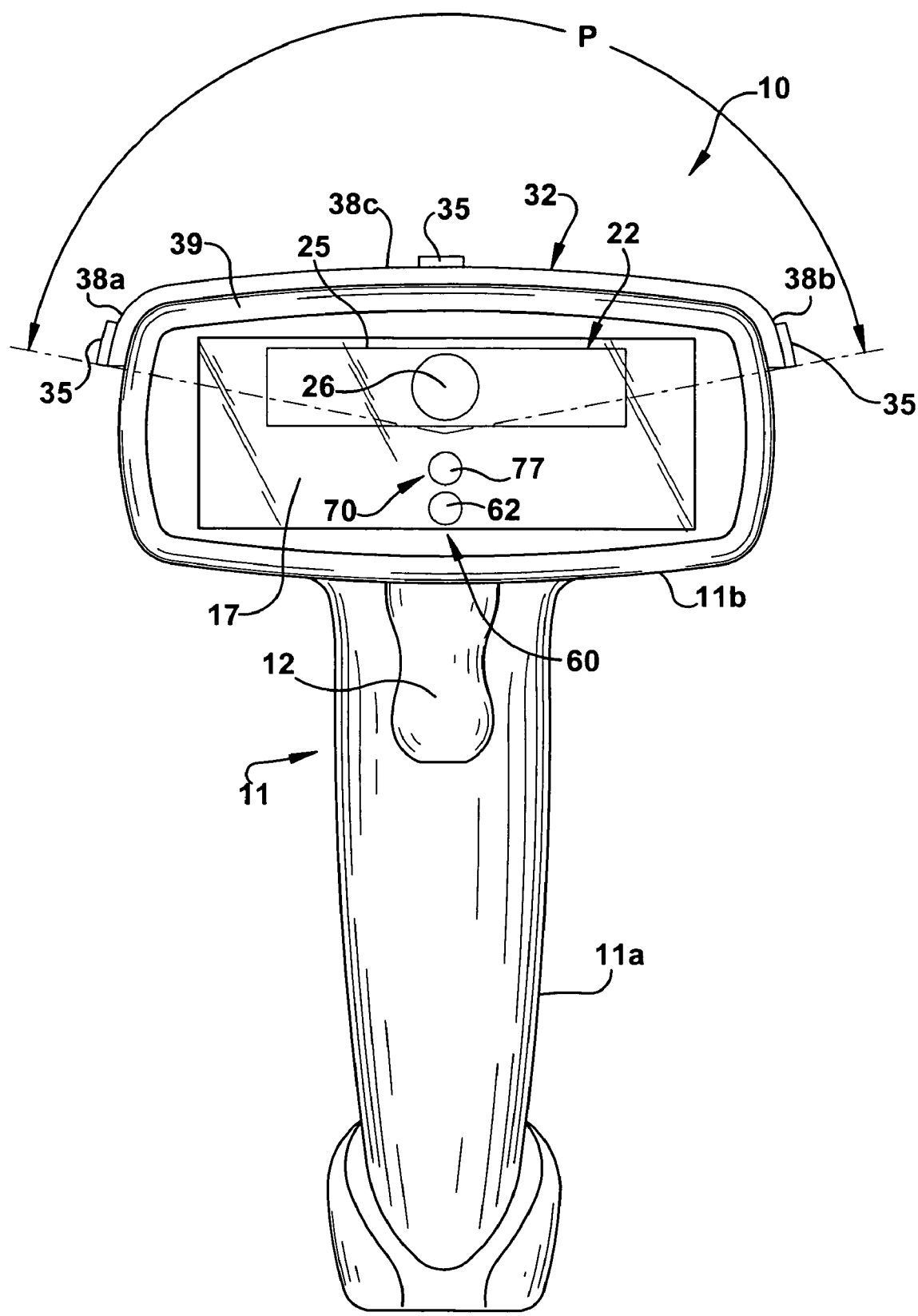
FIG. 2 is a schematic front elevation view of the imaging-based bar code reader of FIG. 1.

As is best seen in FIGS. 1 and 2, the bar code reader housing 11 includes a generally upright gripping portion 11a adapted to be grasped by a user's hand and a horizontally extending scanning head 11b which supports the imaging assembly 20, an illumination assembly 60 and an aiming apparatus 70. At the intersection of gripping portion 11a and the scanning head 11b is a trigger 12 coupled to bar code reader circuitry 13 for initiating reading of target indicia, such as a target bar code 14, when the trigger 12 is pulled or pressed. The bar code reader circuitry 13, the imaging system 20 and the decoding circuitry 40 are coupled to a power supply 16, which may be in the form of an on-board battery or a connected off-board power supply. If powered by an off-board power supply, the scanner 10 may be a stand-alone unit or have some or all of the scanner's functionality provided by a connected host device. When actuated to read the target bar code 14, the imaging system 20 images the target bar code 14 and the decoding system 40 decode a digitized image 14' (shown schematically in FIG. 5) of the target bar code 14.

The reader 10 of the present invention is particularly suited to reading DPM encoded indicia such as DPM bar codes. The target bar code 14 is a DPM bar code wherein the code is permanently marked into a surface profile of a physical object or item 15, as opposed to being imprinted on a diffuse material such as a paper label or packaging. An exemplary target bar code 14 would be a two dimensional DataMatrix bar code (FIGS. 1 & 5) which is often used in DPM applications. The DataMatrix code may be represented by a pattern of indented and non-indented surfaces corresponding to black bars and white spaces of a conventional DataMatrix code imprinted on paper. The pattern of indentations is generated by peening or etching to create craters or indentations on a surface of the item 15.

The imaging system 20 includes the imaging circuitry 24 and decoding circuitry 40 for decoding the imaged target bar code 14' (shown schematically in FIG. 5) within an image frame 42 stored in a memory 44. The imaging and decoding circuitry 24, 40 may be embodied in hardware, software, firmware, electrical circuitry or any combination thereof. The imaging circuitry 24 may be disposed within, partially within, or external to the camera assembly housing 25. Shown schematically in FIG. 4, the imaging camera housing 25 is supported with the scanning head 11b of the housing 11 and receives reflected illumination from the target bar code 14 through a transparent window 17 supported by the scanning head 11b. The focusing lens 26 is supported by a lens holder 26a. The camera housing 25 defines a front opening 25a that supports and seals against the lens holder 26a so that the only illumination incident upon the sensor array 28 is illumination passing through the focusing lens 26. Depending on the specifics of the camera assembly 22, the lens holder 26a may slide in and out within the camera housing front opening 25a to allow dual focusing under the control of the imaging circuitry 24 or the lens holder 26a may be fixed with respect to the camera housing 25 in a fixed focus camera assembly. The lens holder 26a is typically made of metal. A back end of the housing 25 may be comprised of a printed circuit board 25b, which forms part of the imaging circuitry 24 and may extend beyond the housing 25 to support the illumination system 60 and the laser aiming apparatus 70.

The imaging system 20 includes the imager 27 of the imaging camera assembly 22. The imager 27 comprises a charged coupled device (CCD), a complementary metal oxide semiconductor (CMOS), or other imaging pixel array, operating under the control of the imaging circuitry 24. In one exemplary embodiment, the pixel array 28 of the CCD imager 27 comprises a two dimensional (2D) mega pixel array with a typical size of the pixel array being on the order of 1280×1024 pixels. The pixel array 28 is secured to the printed circuit board 25b, in parallel direction for stability.

Figure 3:
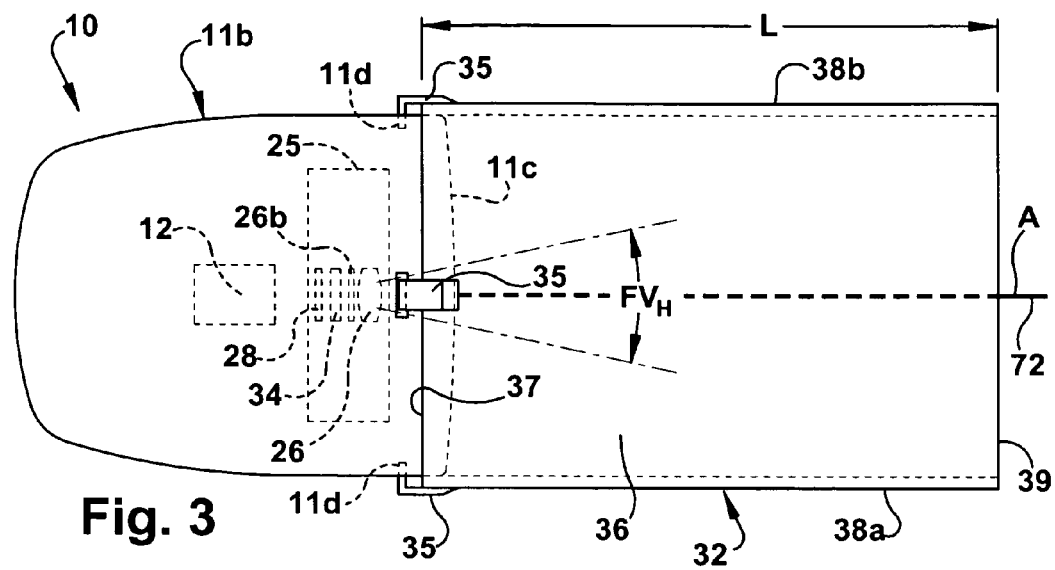
FIG. 3 is a schematic top view of the imaging-based bar code reader of FIG. 1.
Figure 4:
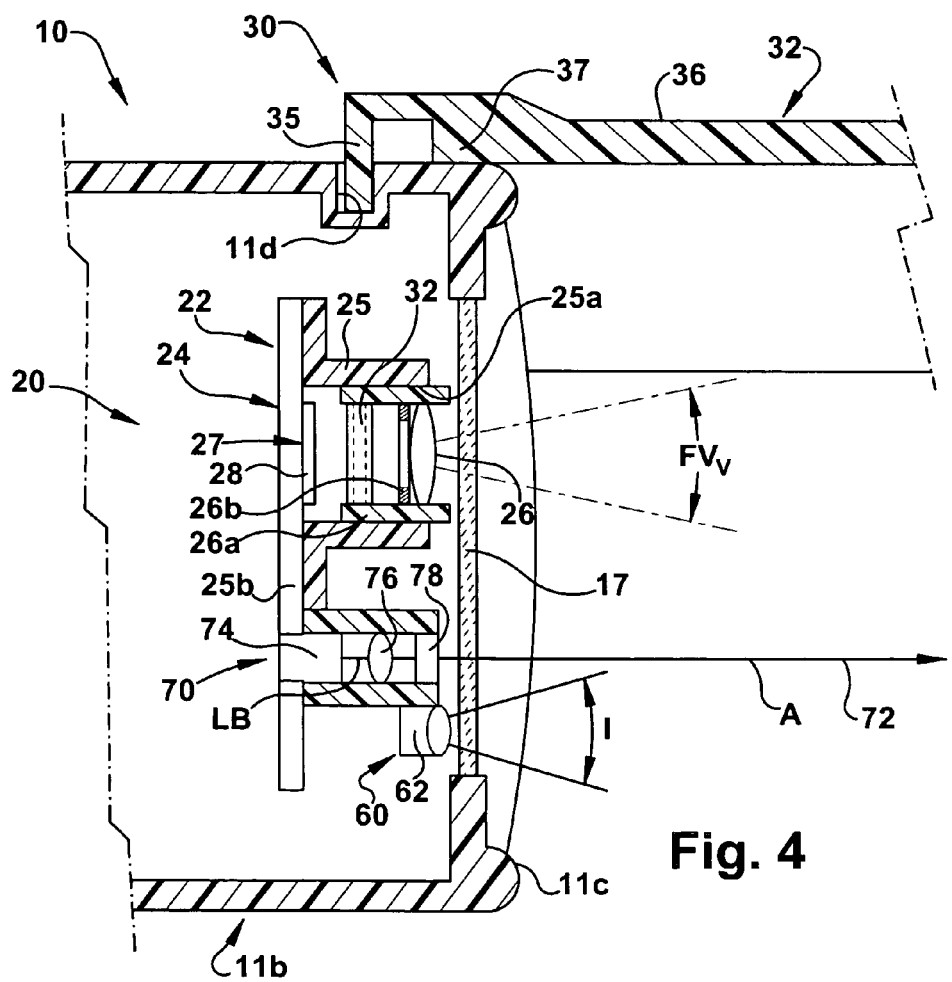
FIG. 4 schematic sectional view of a portion of the imaging-based bar code reader of FIG. 1 showing the scanner head and one embodiment of an ambient illumination shielding apparatus of the present invention.

As is best seen in FIG. 4, the focusing lens 26 focuses light reflected from the target bar code 14 through an aperture 26b onto the pixel/photosensor array 28 of the CCD imager 27. Thus, the focusing lens 26 focuses an image of the target bar code 14 (assuming it is within the field of view FV) onto the array of pixels comprising the pixel array 28. The focusing lens 26 field of view FV includes both a horizontal and a vertical field of view, the horizontal field of view being shown schematically as FVH in FIG. 3 and the vertical field of view being shown schematically as FVV in FIG. 4.

Figure 5:
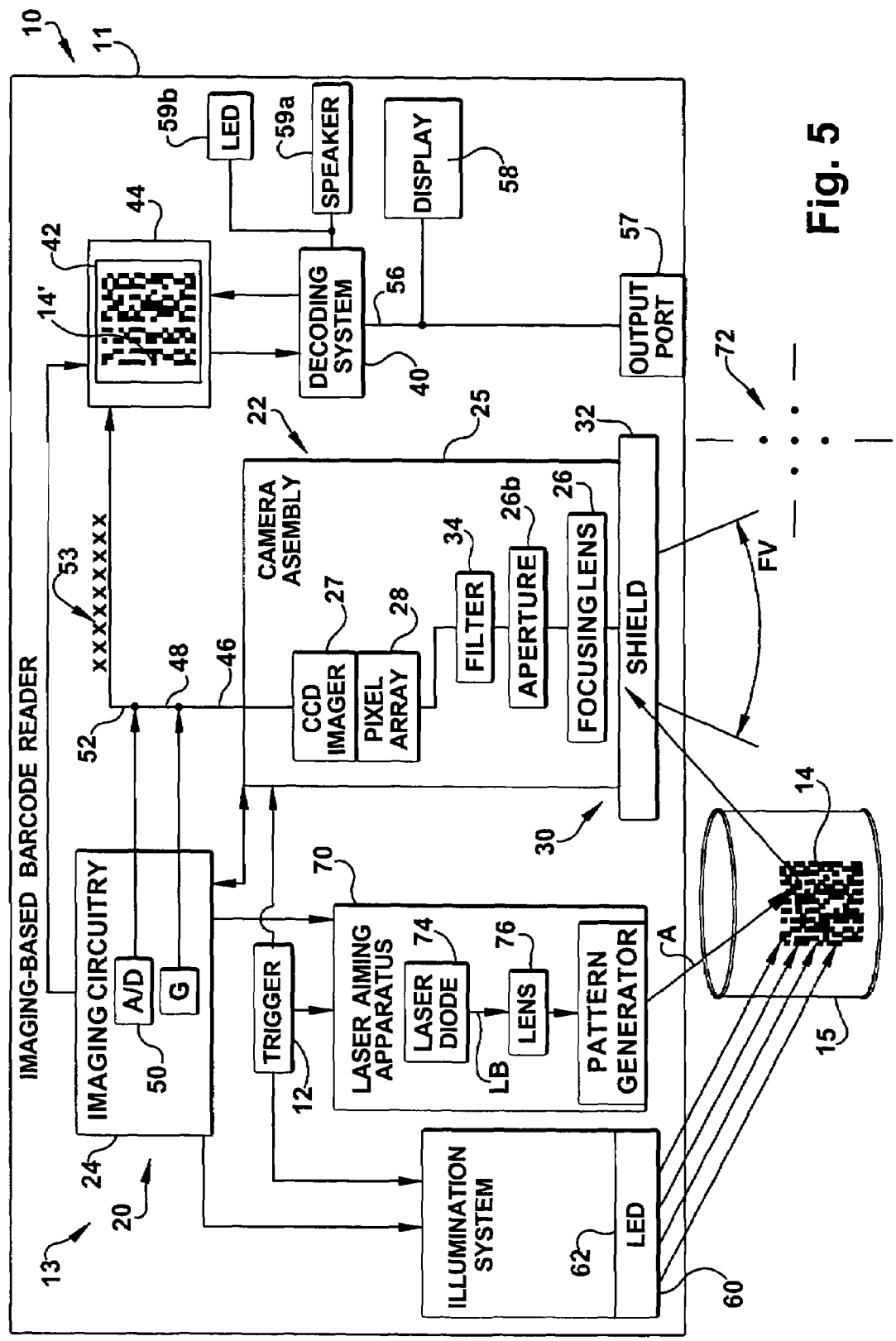
FIG. 5 is a block diagram of an imaging-based bar code reader of FIG. 1.

Electrical signals are generated by reading out of some or all of the pixels of the pixel array 28 after an exposure period. After the exposure time has elapsed, some or all of the pixels of pixel array 28 are successively read out thereby generating an analog signal 46 (FIG. 5). In some sensors, particularly CMOS sensors, all pixels of the pixel array 28 are not exposed at the same time, thus, reading out of some pixels may coincide in time with an exposure period for some other pixels.

The analog image signal 46 represents a sequence of photosensor voltage values, the magnitude of each value representing an intensity of the reflected light received by a photosensor/pixel during an exposure period. The analog signal 46 is amplified by a gain factor, generating an amplified analog signal 48. The imaging circuitry 24 further includes an analog-to-digital (A/D) converter 50. The amplified analog signal 48 is digitized by the A/D converter 50 generating a digitized signal 52. The digitized signal 52 comprises a sequence of digital gray scale values 53 typically ranging from 0-255 (for an eight bit processor, i.e., $2^8=256$), where a 0 gray scale value would represent an absence of any reflected light received by a pixel (characterized as low pixel brightness) and a 255 gray scale value would represent a very intense level of reflected light received by a pixel during an integration period (characterized as high pixel brightness).

The digitized gray scale values 53 of the digitized signal 52 are stored in the memory 44. The digital values 53 corresponding to a read out of the pixel array 28 constitute the image frame 42, which is representative of the image projected by the focusing lens 26 onto the pixel array 28 during an exposure period. If the field of view FV of the focusing lens 26 includes the target bar code 14, then a digital gray scale value image 14' of the target bar code 14 would be present in the image frame 42.

The decoding circuitry 40 then operates on the digitized gray scale values 53 of the image frame 42 and attempts to decode any decodable image within the image frame, e.g., the imaged target bar code 14'. If the decoding is successful, decoded data 56, representative of the data/information coded in the bar code 14 is then output via a data output port 57 and/or displayed to a user of the reader 10 via a display 58. A more detailed description of DPM imaging and decoding is set forth in U.S. Ser. No. 11/032,767, filed Jan. 10, 2006 and entitled "Barcode Scanner Decoding." U.S. Ser. No. 11/032,767 is assigned to the assignee of the present invention and is incorporated herein in its entirety by reference. Upon achieving a good "read" of the bar code 14, that is, the bar code 14 was successfully imaged and decoded, a speaker 59a and/or an indicator LED 59b is activated by the bar code reader circuitry 13 to indicate to the user that the target bar code 14 has successfully read, that is, the target bar code 14 has been successfully imaged and the imaged bar code 14' has been successfully decoded.

The bar code reader 10 further includes the illumination assembly 60 for directing a beam of illumination to illuminate the target bar code 14 and the aiming apparatus 70 for generating a visible aiming pattern 72 (FIG. 5) to aid the user in properly aiming the reader at the target bar code 14. The illumination assembly 60 and the aiming apparatus 70 operate under the control of the imaging circuitry 24. As can best be seen in FIGS. 2-4, in one preferred embodiment, the illumination assembly 60 is a single LED 62 producing a wide illumination angle to completely illuminate the target bar code 14.

The LED 62 is supported within the scanning head 11b just behind the transparent window 17 and face forwardly, that is, toward the target bar code 14. The LED 62 is positioned away from the focusing lens 26 to increase the illumination angle (shown schematically as I in FIG. 4) produced by the LED 62. Preferably, the illumination provided by the illumination assembly 60 is intermittent or flash illumination as opposed to continuously on illumination to save on power consumption. Also, preferably, the LED 62 is red at the higher end of the red wavelength range, e.g., approximate wavelength around 670 nanometers (nm.)), since red LEDs of this wavelength have been found to provide for efficient conversion of electrons to photons by the LEDs and from photons back to electrons by the photosensor array 28.

In one exemplary embodiment, the aiming apparatus 70 is a laser aiming apparatus. The aiming pattern 72 may be a pattern comprising a single dot of illumination, a plurality of dots and/or lines of illumination or overlapping groups of dots/lines of illumination (FIG. 5). The laser aiming apparatus 70 includes a laser diode 74, a focusing lens 76 and a pattern generator 77 for generating the desired aiming pattern 77. The laser diode 74, the lens 76 and the pattern generator are supported by a lens holder 78 which extends from the printed circuit board 25b. Typically, the laser diode emits a red colored illumination on the shorter end of the red wavelength range e.g., 625 nm. which is easier to discern to the human eye than red color having a longer wavelength. Alternately, the laser diode 74 may emit a yellow, green or yellow-green colored illumination (approximate wavelengths—green—492-577 nm., yellow—577-597 nm.) because a yellow-green color provides excellent visibility to a user of the reader 10. The aiming apparatus 70 is supported in the scanning head 11b and the aiming pattern exits the head through the transparent window 17.

Operating under the control of the imaging circuitry 24, when the user has properly aimed the reader 10 by directing the aiming pattern 72 onto the target bar code 14, the aiming apparatus 70 is turned off when an image of the target bar code 14 is acquired such that the aiming pattern 72 does not appear in the captured image frame 42. Intermittantly, especially when the scanner imaging circuitry 24 is transferring the captured image frame 42 to memory 44 and/or when processing the image, the aiming apparatus 70 is turned back on. If the decoding circuitry 40 cannot decode the imaged bar code 14' and the user in the mean time has not released the trigger 12, the process of acquiring an image of the target bar code 14 set forth above is repeated.

Ambient Illumination Shielding Apparatus 30

The reader 10 of the present invention includes the ambient illumination shielding apparatus 30 including the illumination shield 32 and the filter 34. The purpose of the shielding apparatus 30 is to reduce the amount or level of ambient illumination that is projected upon the photosensor array 28. As will be explained below, the bandpass ranges of the shield 32 and the filter 34 are complementary, that is, ambient illumination wavelengths that are passed by the shield 32 will be blocked by the filter 34 and vice versa, that is, the ambient illumination wavelengths that are passed by the filter 34 are blocked by the shield 32. The two components of the shielding apparatus 30 thereby work in tandem to eliminate ambient illumination incident upon the photosensor array 28.

Reducing ambient illumination is extremely important in reading DPM bar codes where the presence of ambient illumination sources such as overhead lights, sunlight, etc. produce multiple shadows and highlights for each individual bar code feature. That is, for each indentation or crater in the surface of the item 15 multiple sources of ambient illumination will result in multiple overlapping and overlying shadows and highlights. The presence of multiple shadows and highlights for each indentation unduly complicates the decoding of the bar code image 14' represented in the captured image frame 42. The multiple shadows/highlights blur the demarcation or boundary of the craters and the background of the bar code 14 and result in the bar code image 14' being more difficult for the decoding circuitry 40 to successfully decode.

The illumination shield 32 is an attachment to the reader housing 11 that attaches to and extends from a forwardly facing front snout 11c of the scanning head 11b along a direction A (FIG. 3) of the aiming pattern 72. The illumination shield 32 is above the aiming pattern 72 and extends forwardly substantially parallel to the aiming pattern 72. As can best be seen in FIGS. 3 and 4, the shield 32 envelopes the field of view FV of the focusing lens 26. The illumination shield 32 may permanently attached to the housing snout 11c or be removable, as desired. The illumination shield 32 is preferably fabricated of a clear polymer base material into which a colored dye is mixed or injected resulting in an opaque colored shield. Suitable polymer base materials include polycarbonate, which is both strong and transparent and allyl diglycol polycarbonate (also know as CR-39). Injection molding, a high temperature and high pressure injection process, would generally be used to manufacture a shield using polycarbonate as a base material. CR-39 would be fabricated into a shield generally by thermal setting, a low temperature solidification process. From an optical stress-free point of view, the CR-39 usually provides the best optical quality.

With a proper choice of dies and doping concentration, one may produce a shield having desired optical filtering properties. The choice for dyes is mainly based on the manufacturing process and is also a function of which optical plastic vendor one chooses to work with.

By way of example, to make a red color filter, that is, a filter that passes a significant proportion of illumination in the red color range at a center wavelength of 625 nm. using polycarbonate as the substrate or base material, one may use 5% FeO and 3% NaF raw powder materials to be mixed up evenly with the polycarbonate base powder material. The mixture is heated to about 450° C. where it is the liquid state. The melt is then injected into the cavity of an appropriately shaped mold, the temperature is lowered to solidify the melt materials and the shield is then ejected from the mold.

In theory, for plastic color filters, there is some limitation for the optical filtering property in terms of the slope sharpness and the position accuracy for the center wavelength (the transmission point at the 50% level). The typical slope sharpness is about 25 nm. For the transmittance change from 20-70% and the typical position accuracy for the center wavelength is about ±10 nm. To describe the proper optical filtering property, the industry typically uses the defined transmission spectral curve instead of visual color.

Since it is ergonomically advantageous and convenient to allow the user to operate the reader 10 with the reader and the target bar code 14 below eye level, it is important to allow the user to look though the shield 32 to see the target bar code 14 and to see the aiming pattern 72 so that the user can quickly and intuitively properly aim the reader 10 at the target bar code. The selected dye acts as a color filter having a predetermined pass band range which permits only certain wavelengths of visible illumination to pass. Accordingly, since it is desired for both the aiming pattern 72 and the target bar code 14 to be viewed through the shield 32, the dye is selected to have a bandpass range that includes the aiming pattern wavelength range and provides enough passband to allow the target bar code 14 to be seen by the user.

For example, assuming the aiming pattern 72 yellow-green, to enable the user to view the aiming pattern 72 when projected onto the target bar code 14, the pass band range of the illumination shield 32 would include the range of 492-597 nm. Further, since it is desired to have enough illumination to allow the user to view the target bar code 14 while looking though the shield 32, the band pass of the shield could be increased to, for example, include blue, green and yellow light, i.e., a range of 455-597 nm. The shield 32 would effectively block illumination wavelengths outside of the pass band range to limit the ambient illumination incident on the photosensor array 28.

Since most sources of ambient illumination are located above the user, overhead lights, sunlight, etc., the illumination shield 32, when viewed in section, conforms to and overlies an upper portion of the housing snout 11c shown as angular proportion P in FIGS. 2 and 6. It should be understood, that the angular proportion P may be changed depending on ambient light conditions and may be less or more that the angular proportion P shown in FIGS. 2 and 6.

This configuration of the illumination shield 32 allows reflected illumination from the illumination assembly 60 which is reflected from the target bar code 14 to be received by the focusing lens 26 without interference by the shield 32. It further allows the user to view the target bar code 14 and the aiming pattern 72 through the shield while blocking a large portion of the overhead ambient illumination.

Note that a length L and shape of the illumination shield 32 and the position and optics of focusing lens 26 are selected such that the horizontal and vertical fields of view FVH, FVV of the focusing lens do not impinge on the illumination shield 32. That is, the illumination shield 32 does not block reflected light, generated by the illumination assembly 60, from the being received by the focusing lens 26 when such reflected light is within the field of view FVH, FVV of the focusing lens 26. Further, configuring the illumination shield 32 to encircle about half of the snout 11c or less makes it flexible and easy to attach and detach the shield from the housing 11. The shield 32 may be attached to the housing snout 11c via any suitable mechanism know to those of skill in the art. By way of illustration only, in FIGS. 3 and 6, the shield 32 is removably attached to the housing snout 11c via three arms 35 extending from an outer surface 36 of an end portion 37 of the shield 32. The curved end portions of the arms 35 snap fit into mating slotted openings 11d in an end portion of the snout 11c.

It should be appreciated that depending on ambient light conditions expected, the position and optics of the focusing lens 26 and the configuration of the illumination shield 32, the illumination shield 32 may block a portion of the vertical and/or horizontal field of view of the focusing lens so long as sufficient reflected light from the target bar code 14 is received by the photosensor array 28 to successfully read the imaged bar code 14'.

In one exemplary embodiment, the length L of the shield 32 is matched to the best focus point of the focusing lens 32 such that a forward end 39 of the shield is substantially congruent with best focus point. The best focus point of the camera assembly 22 is the point at which a target object in front of the camera assembly would have the clearest image projected onto the photosensor array 28. In other words, the shield 32 is configured such that the user contacts the end 37 of the shield 32 to the item 15 when reading the bar code 14. The user simply aligns the aiming pattern 72 with the DPM bar code 14 on the item 15 and then move the reader 10 toward the bar code 14 until the end 37 of the shield 32 touches the item 15. In this way, substantially all overhead ambient light sources are filtered out except for the pass band wavelength range of the shield 32.

It should be understood that while the shield 32 is shown as an inverted U-shape with generally parallel sides 38a, 38b, the shape of the shield may be varied depending upon the particular characteristics of the focusing lens 26 and the target bar code 14 being read. For example, the sides 38a, 38b may flair outwardly toward the distal end 39 to accommodate a wider horizontal field of view FVH of the focusing lens 26 or an upper side 38c may flair upwardly toward the distal end 39 to accommodate a wider vertical field of view FVV.

As is best seen in FIG. 4, the color filter 34 is disposed between the focusing lens 26 and the photosensor array 28. Positioning the filter 34 in space between the photosensor array 28 and the focusing lens 26 does not detrimentally affect the functioning of the focusing lens 26 (although the lens 26 may have to be positioned slightly further away from the photosensor array 28 to maintain the same focus onto the photosensor array 28). The filter 34 may be a narrow bandpass interference filter which filters out wavelengths of illumination other than the wavelength range that corresponds to the wavelength of the illumination generated by the illumination assembly 60. For example, if the illumination assembly 60 utilizes red LEDs having a wavelength range of approximately 622-780 nm., the pass band of the filter 34 would include the range of 622-780 nm. An appropriate narrow bandpass interference filter may be obtained from various optical suppliers such as Edmund Optics, Barrington, N.J. 08007 (www.edmundoptics.com).

Alternately, instead of being purchased, the interference filter 34 may be fabricated using the techniques of thin-film filter fabrication. A thin film filter is a multi-layer, light filtering coating that is built up layer by layer on a substrate such as clear plastic by evaporative deposition or other method. When complete, the thin film coating has appropriate wavelength blocking characteristics. Specifics on fabricating a thin film bandpass filter may be found in a book entitled *Thin-Film Optical Filters*, 3$^{rd}$ Edition, by H. Angus Macleod, Institute of Physics Publishing, Dirac House, Temple Back, Bristol, UK Bs16BE, copyright 2110, ISBN 0 7503 06882. The aforementioned book is incorporated in its entirety herein by reference.

As discussed above, what is important to note is that the bandpass ranges of the shield 32 and the filter 34 are complementary. The ambient illumination wavelengths that are passed by the shield 32 (e.g., passband 455-597 nm.) will be blocked by the filter 34 (e.g., passband 622-780 nm.) and vice versa, that is, the ambient illumination wavelengths that are passed by the filter 34 are blocked by the shield 32 thereby eliminating as much as possible ambient illumination incident upon the photosensor array 28. It should be noted that either one of the shield 32 and the filter 34 can be used alone to block a large percentage of the ambient light. However, their usage in combination provides the best ambient light rejection functionality.

While the filter 34 is shown as a separate component in FIG. 4 disposed between the focusing lens 26 and the photosensor array 28, it should be appreciated that the filter 34 may be disposed upstream, that is, outwardly of the focusing lens 26. Additionally, as shown in FIG. 7, the filter 34 may be incorporated into the transparent window 17' (or a portion of the transparent window 17' adjacent the camera housing 25) thereby eliminating the need for having two separate components for the window 17 and the filter 34.

It should be noted that if the filter 34 is incorporated into the window 17' including a portion of the window through which the aiming pattern 72 is projected, then it will be necessary to insure that the pass band of the window 17' includes both the wavelength of the aiming pattern 72 (which is desired to be short wavelength red (625 nm.), yellow, green or yellow-green colored illumination) and the wavelength of the illumination LED 62 (which is desired to be longer wavelength red (670 nm.) colored illumination).

For example, if the band pass range of the window 17' does not include the wavelength range of the illumination LEDs 62, the illumination LEDs will not be able to properly illuminate the target bar code 14. If the band pass range of the color filter does not include the wavelength range of the aiming pattern 72, the aiming pattern will be blocked from exiting through the window 17' and thus rendered useless to the user. Finally, as discussed previously, if the band pass range of the shield 32 does not include the wavelength range of the aiming pattern 72, the user will not be able to look through the shield and see the aiming pattern projected onto the target bar code 14.

Obviously, if the window 17' passes illumination of both the short red (625 nm.) and longer red color (670 nm.) wavelengths, ambient illumination in these color wavelength ranges would also pass through the window 17'. However, the bandpass ranges of the shield 32 and the window 17' are complementary in that ambient illumination of the longer red color wavelength range (670 nm.) would be advantageously blocked by the shield 32, that is, the shield 32 would only allow short wavelength red color (625 nm.) to pass.

While the present invention has been described with a degree of particularity, it is the intent that the invention includes all modifications and alterations from the disclosed design falling within the spirit or scope of the appended claims.

We claim:

1. An ambient illumination shielding apparatus for an imaging-based scanner including an aiming apparatus for generating an aiming pattern for use in aiming the scanner at a target object, an illumination assembly for generating illumination for illuminating the target object and an imaging system including a pixel array for imaging the target object, the ambient illumination shielding apparatus comprising:

an illumination shield extending exterior of a housing of the scanner and extending along at least a portion of a path of travel of the aiming pattern, the shield passing illumination within a predetermined wavelength range and impeding passage of illumination outside of the predetermined wavelength range, the predetermined wavelength range of the shield including a wavelength range of the aiming pattern generated by the aiming apparatus; and a filter disposed in proximity to the imaging system and passing illumination within a predetermined wavelength range to the pixel array and impeding the passage of illumination outside of the predetermined wavelength range, the predetermined wavelength range of the filter including a wavelength range of the illumination system.

2. The ambient illumination shielding apparatus of claim 1 wherein the predetermined wavelength range of the shield and the predetermined wavelength range of the filter do not overlap.

3. The ambient illumination shielding apparatus of claim 1 wherein the imaging system includes a focusing lens disposed within a camera assembly housing and the filter is disposed within the camera assembly housing adjacent the focusing lens.

4. The ambient illumination shielding apparatus of claim 3 wherein the filter is disposed between the focusing lens and the pixel array.

5. The ambient illumination shielding apparatus of claim 1 wherein the filter is incorporated into a window supported by the scanner housing through which illumination from the illumination assembly passes to exit the scanner housing and through which reflected illumination from the target object passes to enter the scanner housing.

6. The ambient illumination shielding apparatus of claim 1 wherein the filter is a narrow bandpass interference filter.

7. The ambient illumination shielding apparatus of claim 1 wherein the filter comprises a thin film filter deposited on a substrate.

8. The ambient illumination shielding apparatus of claim 1 wherein the shield extends from an upper portion of the scanner housing and extends above at least a portion of the aiming pattern.

9. The ambient illumination shielding apparatus of claim 1 wherein the shield extends parallel to the aiming pattern to a point substantially equal to a best focus position of the imaging assembly.

10. The ambient illumination shielding apparatus of claim 1 wherein the shield comprises a polycarbonate base material and a dye material additive which functions as a selective bandpass filter.

11. A bar code reader comprising:

an aiming apparatus generating an aiming pattern to aid in aiming the system at a target bar code;

an illumination system for generating illumination directed at the target bar code;

an imaging system including a pixel array, and a focusing lens to focus an image of the target bar code onto the pixel array; and an ambient illumination shielding assembly including:

an illumination shield extending exterior of a housing of the scanner and extending along at least a portion of a path of travel of the aiming pattern, the shield passing illumination within a bandpass range and impeding passage of illumination outside of the shield bandpass wavelength range, the shield bandpass range of the shield including a wavelength range of the aiming pattern generated by the aiming apparatus; and a filter disposed in proximity to the imaging system and passing illumination within a bandpass range to the pixel array and impeding the passage of illumination outside of the filter bandpass range, the filter bandpass range of the filter including a wavelength range of the illumination system.

12. The bar code reader of claim 11 wherein the shield bandpass range and the filter bandpass range do not overlap.

13. The bar code reader of claim 11 wherein the imaging system includes a focusing lens disposed within a camera assembly housing and the filter is disposed within the camera assembly housing adjacent the focusing lens.

14. The bar code reader of claim 13 wherein the filter is disposed between the focusing lens and the pixel array.

15. The bar code reader of claim 11 wherein the filter is incorporated into a window supported by the scanner housing through which illumination from the illumination assembly passes to exit the scanner housing and through which reflected illumination from the target object passes to enter the scanner housing.

16. The bar code reader of claim 11 wherein the filter is a narrow bandpass interference filter.

17. The bar code reader of claim 11 wherein the filter comprises a thin film filter deposited on a substrate.

18. The bar code reader of claim 11 wherein the shield extends from an upper portion of the scanner housing and extends above at least a portion of the aiming pattern.

19. The bar code reader of claim 11 wherein the shield extends parallel to the aiming pattern to a point substantially equal to a best focus position of the imaging assembly.

20. The bar code reader of claim 11 the shield comprises a polycarbonate base material and dye material additive which functions as a selective bandpass filter.

* * * * *